(12) United States Patent
Morishima et al.

(10) Patent No.: US 9,825,299 B2
(45) Date of Patent: Nov. 21, 2017

(54) NONAQUEOUS ELECTROLYTE SECONDARY CELL

(71) Applicant: TOYOTA JIDOSHA KABUSHIKI KAISHA, Toyota-shi, Aichi-ken (JP)

(72) Inventors: Ryuta Morishima, Nagoya (JP); Ryo Hanazaki, Toyota (JP); Nobuo Matsui, Seto (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/226,104

(22) Filed: Aug. 2, 2016

(65) Prior Publication Data

US 2017/0040614 A1    Feb. 9, 2017

(30) Foreign Application Priority Data

Aug. 6, 2015 (JP) ................. 2015-156389

(51) Int. Cl.
*H01M 4/62* (2006.01)
*H01M 10/0525* (2010.01)
(Continued)

(52) U.S. Cl.
CPC .......... *H01M 4/625* (2013.01); *H01M 4/366* (2013.01); *H01M 4/587* (2013.01);
(Continued)

(58) Field of Classification Search
CPC ...... H01M 4/625; H01M 4/366; H01M 4/587; H01M 10/0525; H01M 2004/021; H01M 4/133; H01M 4/525
See application file for complete search history.

(56) References Cited

U.S. PATENT DOCUMENTS

| 7,070,883 B2* | 7/2006 | Omaru | H01M 2/348 |
| | | | 429/231.1 |
| 2009/0004569 A1* | 1/2009 | Yamamoto | H01M 4/133 |
| | | | 429/231.8 |

(Continued)

FOREIGN PATENT DOCUMENTS

| JP | 2013-258392 A | 12/2013 |
| JP | 2017-033881 A | 2/2017 |

*Primary Examiner* — Stewart Fraser
(74) *Attorney, Agent, or Firm* — Sughrue Mion, PLLC (57) ABSTRACT

Provided is a nonaqueous electrolyte secondary cell in which heat generation is suppressed. The nonaqueous electrolyte secondary cell according to the invention has a positive electrode including positive electrode active material particles and a negative electrode including negative electrode active material particles. The negative electrode active material particles are carbon-black-adhered carbon-based negative electrode active material particles which are constituted by a carbon material having a graphite structure in at least part thereof and which have carbon black (CB) particles that have adhered to at least part of a surface portion. The positive electrode active material particles are of a hollow structure having a shell and a hollow portion. The average short diameter A of the CB particles in the carbon-black-adhered carbon-based negative electrode active material particles and an average inner diameter B of the hollow portions in the positive electrode active material particles fulfill the relationship: $1.2 \leq B/A \leq 260$.

2 Claims, 3 Drawing Sheets

(51) Int. Cl.
*H01M 4/36* (2006.01)
*H01M 4/587* (2010.01)
H01M 4/131 (2010.01)
H01M 4/133 (2010.01)
H01M 4/505 (2010.01)
H01M 4/525 (2010.01)
H01M 4/02 (2006.01)

(52) U.S. Cl.
CPC ........ H01M 10/0525 (2013.01); *H01M 4/131* (2013.01); *H01M 4/133* (2013.01); *H01M 4/505* (2013.01); *H01M 4/525* (2013.01); *H01M 2004/021* (2013.01); *H01M 2220/20* (2013.01); *H01M 2300/0017* (2013.01)

(56) References Cited

U.S. PATENT DOCUMENTS

| | | | |
|---|---|---|---|
| 2012/0214070 A1* | 8/2012 | Yamamoto | H01M 4/485 429/231.8 |
| 2013/0130113 A1* | 5/2013 | Takano | H01M 4/131 429/223 |
| 2013/0309577 A1 | 11/2013 | Hayashi et al. | |
| 2017/0040609 A1 | 2/2017 | Takahata | |

* cited by examiner

NONAQUEOUS ELECTROLYTE SECONDARY CELL

BACKGROUND OF THE INVENTION

1. Field of the Invention

The present invention relates to a nonaqueous electrolyte secondary cell, and more particularly to a nonaqueous electrolyte secondary cell including a positive electrode in which a positive electrode active material layer including positive electrode active material particles is held on a positive electrode collector and a negative electrode in which a negative electrode active material layer including negative electrode active material particles is held on a negative electrode collector.

The present application claims priority to Japanese Patent Application No. 2015-156389 filed on Aug. 6, 2015, the entire contents of which are hereby incorporated by reference.

2. Description of the Related Art

Lithium ion secondary cells, nickel hydride cells, and other nonaqueous electrolyte secondary cells have recently gained importance as power sources to be installed on vehicles and also power sources for personal computers and portable terminals. In particular, lithium ion secondary cells which are lightweight and make it possible to obtain a high energy density have been advantageously used as high-output drive power sources for installation on vehicles.

A typical configuration of a nonaqueous electrolyte secondary cell of this type includes electrodes in which an electrode active material capable of reversibly absorbing and desorbing charge carriers, (for example lithium ions in the case of a lithium ion secondary cell) is formed on an electrode collector. For example, a carbon material such as graphite is an electrode active material (negative electrode active material) for use in a negative electrode. A copper foil is an example of a collector (negative electrode collector) for use in a negative electrode. Japanese Patent Application Publication No. 2013-258392 discloses the conventional technique relating to the negative electrode of this type. Thus, Japanese Patent Application Publication No. 2013-258392 discloses the feature of using as a negative electrode active material a composite carbon material in which the surface of a carbon material forming a core is covered with a carbon black. Japanese Patent Application Publication No. 2013-258392 indicates that an excellent low-temperature characteristic can be realized as a result of covering the carbon material surface with a carbon black.

SUMMARY OF THE INVENTION

However, the findings of the inventors have demonstrated that where a carbon black (CB) is caused to adhere to the surface portion of a carbon material, as disclosed in Japanese Patent Application Publication No. 2013-258392, the carbon black adhered to the surface portion can slip off and be freed into an electrolytic solution as a result of expansion and contraction of the carbon material caused by charging and discharging. Since the carbon black freed into the electrolytic solution absorbs the charge carriers, it can result in degraded thermal stability and enhanced heat generation in the cell, e.g. during overcharging. It is an objective of the present invention to resolve this problem.

The nonaqueous electrolyte secondary cell provided by the present invention includes: a positive electrode in which a positive electrode active material layer including positive electrode active material particles is formed on a positive electrode collector; a negative electrode in which a negative electrode active material layer including negative electrode active material particles is formed on a negative electrode collector; and a nonaqueous electrolytic solution. The negative electrode active material particles are carbon-black-adhered carbon-based negative electrode active material particles which are constituted by a carbon material having a graphite structure in at least part thereof and which have carbon black (represented hereinbelow simply as "CB") particles that have adhered to at least part of a surface portion. The positive electrode active material particles are of the so-called hollow structure having a shell and a hollow portion formed inside the shell. An average short diameter A of the CB particles in the carbon-black-adhered carbon-based negative electrode active material particles and an average inner diameter B of the hollow portions in the positive electrode active material particles fulfill the relationship: $1.2 \leq B/A \leq 260$. With such a configuration, heat generation in the cell, e.g. during overcharging, can be effectively suppressed.

In the preferred aspect of the nonaqueous electrolyte secondary cell disclosed herein, the average short diameter A of the CB particles and the average inner diameter B of the hollow portions fulfill the relationship: $68 \leq B/A \leq 138$. As a result, heat generation in the cell can be suppressed even better.

DESCRIPTION OF THE PREFERRED EMBODIMENTS

The preferred embodiment of the present invention will be explained hereinbelow with reference to the appended drawings. The drawings are drawn schematically and do not necessarily reflect actual articles. It should be noted that matters necessary for carrying out the present invention other than those specifically referred to in the description are understood to be matters of design for a person skilled in the art which are based on the related art in the pertinent field. The present invention can be implemented on the basis of the contents disclosed in the present specification and common technical knowledge in the pertinent field.

Figure 1:
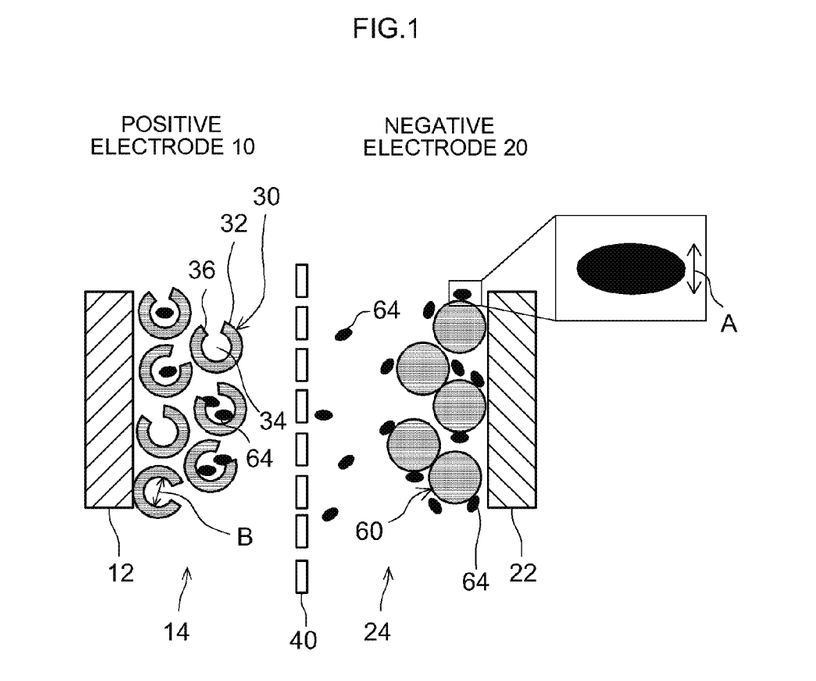
FIG. 1 illustrates the configuration of the lithium ion secondary cell according to an embodiment.

As depicted in FIG. 1, a nonaqueous electrolyte secondary cell 100 according to the embodiment of the present invention is provided with a positive electrode 10, a negative electrode 20, and a nonaqueous electrolytic solution. The nonaqueous electrolyte secondary cell according to the present embodiment will be explained hereinbelow by taking the lithium ion secondary cell 100 as an example, but such a selection is not intended to be limiting. FIG. 1 is a drawing for explaining the configuration of the lithium ion secondary cell 100.

As depicted in FIG. 1, the lithium ion secondary cell 100 includes the positive electrode 10, the negative electrode 20, a separator 40 interposed between the positive electrode 10 and the negative electrode 20, and a nonaqueous electrolytic solution.

The positive electrode 10 of the aspect disclosed herein has a structure in which a positive electrode active material layer 14 is held on a positive electrode collector 12. An aluminum foil and other metal foils suitable for positive electrodes can be advantageously used for the positive electrode collector 12. The positive electrode active material layer 14 includes positive electrode active material particles 30.

Positive Electrode Active Material Particles

The positive electrode active material particle 30 includes a shell 32 and a hollow portion 34 formed inside the shell 32. The shell 32 is formed by primary particles aggregated in a spherical shape. In other words, the positive electrode active material particle 30 is of a hollow structure having a secondary particle which is the aggregation of primary particles, and the hollow portion 34 formed inside thereof In the present embodiment, a through hole 36 passing from the outside into the hollow portion 34 is formed in the shell 32 of the positive electrode active material particle 30.

In the positive electrode active material particle 30 disclosed herein, the average inner diameter B of the hollow portions 34 is by a factor of 1.2 (inclusive) to 260 (inclusive) larger than the average short diameter A of the CB particles 64 which have adhered to the surface portion of the below-described carbon-black-adhered carbon-based negative electrode active material particles 60. Thus, the average inner diameter B of the hollow portions 34 and the average short diameter A of the CB particles 64 fulfill the relationship represented by Formula (1) below:

$$1.2 \leq B/A \leq 260 \quad (1)$$

By using the positive electrode active material particle 30 in which the average inner diameter B of the hollow portions 34 is larger by a factor 1.2 (inclusive) to 260 (inclusive) than the average short diameter A of the CB particles 64 which have adhered to the surface portion of the carbon-black-adhered carbon-based negative electrode active material particles 60, it is possible to suppress effectively the heat generation in the cell, e.g. during overcharging.

Although it is not required to clarify why the aforementioned effect is demonstrated when the technique disclosed herein is implemented, for example, the following explanation can be suggested. Thus, where the CB particles 64 adhere to the surface portion of the carbon-black-adhered carbon-based negative electrode active material particle 60, the CB particles 64 which have adhered to the surface portion of the carbon-black-adhered carbon-based negative electrode active material particle 60 can slip off and be freed into the nonaqueous electrolytic solution as a result of expansion and contraction of the carbon-black-adhered carbon-based negative electrode active material particle 60 in the course of charging and discharging. Since the CB particles 64 which have been freed into the electrolytic solution absorb charge carriers (in this case, lithium ions), it can result in degraded thermal stability and enhanced heat generation in the cell, e.g. during overcharging.

By contrast, with the present configuration, as a result of the average inner diameter B of the hollow portions 34 of the positive electrode active material particles 30 and the average short diameter A of the CB particles 64 fulfilling the relationship of Formula (1), even when the CB particles 64 slip off from the surface portion of the carbon-black-adhered carbon-based negative electrode active material particle 60 and are freed into the nonaqueous electrolytic solution, the freed CB particles 64 are taken into (typically, physically adsorbed due to a microfilling effect) the hollow portions 34 of the positive electrode active material particles 30. Further, since the CB particles 64 taken into the positive electrode active material particles 30 are exposed to a positive electrode potential, lithium ions absorbed by the CB particles 64 are released. It can be presumed that the thermal stability of the CB particles 64 is thus increased and heat generation in the cell, e.g. during overcharging, is suppressed.

The average inner diameter B of the hollow portions 34 of the positive electrode active material particles 30 may be larger by a factor of 1.2 or more than the average short diameter A of the CB particles 64, and from the standpoint of improving thermal stability, it is preferred that the average inner diameter be larger by a factor of 10 or more (for example, a factor of 40 or more, typically, by a factor of 70 or more). Meanwhile, where the average inner diameter B of the hollow portions 34 is too large by comparison with the average short diameter A of the CB particles 64, the CB particles trapped in the hollow portion 34 are easily freed again by an external force, for example, created by the movement of the electrolytic solution. Where the CB particles are freed again before the lithium ions are released, the above-described effect cannot be sufficiently demonstrated. From the standpoint of preventing the carbon black particles from being freed again, the diameter ratio (B/A) needs to be 260 or less, preferably 138 or less, more preferably 100 or less. The technique disclosed herein can be advantageously implemented, for example, when the relationship between the average inner diameter B of the hollow portions the average short diameter A of the CB particle fulfil the relationship: $1.2 \leq B/A \leq 260$, more preferably $40 \leq B/A \leq 138$, even more preferably $68 \leq B/A \leq 138$, and particularly preferably $90 \leq B/A \leq 120$. In such a case, the CB particles 64 freed from the carbon-black-adhered carbon-based negative electrode active material particle 60 can be trapped over a long period of time inside the positive electrode active material particles 30.

The average inner diameter B of the hollow portions 34 of the positive electrode active material particles 30 is not particularly limited, provided that the relationship with the average short diameter A of the CB particles 64, which is represented by Formula (1), is fulfilled, but from the standpoint of demonstrating even better effect produced by the presence of the hollow portion in the positive electrode active material particle (for example, input/output characteristic improvement effect), it is preferred that the average inner diameter of the hollow portion be 0.5 μm or more, more preferably 1.5 μm or more, even more preferably 2.7 μm or more, and particularly preferably 4 μm or more. The upper limit of the average inner diameter B of the hollow portions 34 is not particularly limited, but it is preferably 15 μm or less, more preferably 12 μm or less, and even more preferably 6 μm or less.

In the present specification, the "average inner diameter B" of the hollow portions of the positive electrode active material particles means the average value of the inner diameters of the hollow portions of a plurality of particles contained in the positive electrode active material layer. Thus, the average inner diameter B is a value indicating the average particle shape of the positive electrode active material particles. The average inner diameter B is determined, for example, in the following manner. Thus, a predetermined number (for example, 300 to 500) of positive electrode active material particles contained in the cross-sectional SEM image of the positive electrode active material layer are observed using a scanning electron microscope (SEM), and hollow portions are extracted on the basis of the difference in color tone or shading of particle images. Then, the diameter of an ideal circle (true circle) having the surface area equal to the surface area of the hollow portion which has been calculated from each particle image is calculated as the inner diameter of the hollow portion of each particle. The average inner diameter B can then be determined by arithmetic averaging of the inner diameters of hollow portions of the predetermined number of positive electrode active material particles. The inner diameter of the hollow portions of the particles can be easily determined using image analysis software in a computer that performs predetermined processing according to a predetermined program.

The average diameter of positive electrode active material particles (secondary particles) 30 disclosed herein is preferably about 1 μm to 25 μm. With the positive electrode active material particles 30 of such a configuration, good cell performance can be demonstrated more stably. It is more preferred that the average particle diameter be about 3 μm or more. From the standpoint of productivity of the positive electrode active material particles, it is preferred that the average particle diameter be about 25 μm or less, more preferably about 20 μm or less (for example, about 15 μm or less). According to the preferred aspect, the average particle diameter of the positive electrode active material particles is about 3 μm to 10 μm. The average particle diameter of the positive electrode active material particles can be determined by measurements based on the laser diffraction and scattering method.

The material of the positive electrode active material particles 30 is not particularly limited, provided that it can be used for the positive electrode of a typical lithium ion secondary cell. For example, various lithium transition metal oxides capable of reversibly absorbing and releasing lithium ions can be used. For example, lithium transition metal oxides of a layered structure and lithium transition metal oxides of a spinel structure can be used. A nickel-containing lithium composite oxide including at least nickel as a constituent element is a preferred example of the lithium transition metal oxide having a layered crystal structure. Such a nickel-containing lithium composite oxide can also include, in addition to Li and Ni, one or two or more other metal elements (that is, transition metal elements and/or typical metal elements other than lithium and nickel). For example, it may be a nickel-containing lithium composite oxide including nickel, cobalt, and manganese as constituent elements. A nickel-containing lithium composite oxide in which the principal component among those transition metal elements is Ni, or in which Ni, Co, and Mn are contained at a substantially the same ratio is preferred.

Further, one or two or more other elements may be included as additional constituent elements (additional elements) in addition to the abovementioned transition metal elements.

The preferred composition of the positive electrode active material particles disclosed herein is a layered nickel-containing lithium composite oxide represented by the following general formula (I):

$$Li_{1+m}Ni_pCo_qMn_rM^1_sO_2 \qquad (I)$$

In Formula (I), $M^1$ is one or two or more elements selected from the group including W, Zr, Mg, Ca, Na, Fe, Cr, Zn, Si, Sn, Al, B, and F, and m is a number satisfying the condition $0 \leq m \leq 0.2$ (preferably, $0.05 \leq m \leq 0.2$). Further, p is a number satisfying the condition $0.1 \leq p \leq 0.9$ (preferably, $0.2 \leq p \leq 0.6$), q is a number satisfying the condition $0 \leq q \leq 0.5$ (preferably, $0.1 < q < 0.4$), r is a number satisfying the condition $0 \leq r \leq 0.5$ (preferably, $0.1 < r < 0.4$), s is a number satisfying the condition $0 \leq s \leq 0.2$ (preferably, $0 \leq s \leq 0.02$, more preferably $0 < s \leq 0.01$). Typically, $p+q+r+s=1$. In a certain embodiment, $0 \leq s < p$. Further, s may be substantially 0 (that is, an oxide containing substantially no $M^1$).

The negative electrode 20 according to one embodiment disclosed herein has a structure in which the negative electrode active material layer 24 is held on the negative electrode collector 22. A copper foil and other metal foils suitable for a negative electrode can be advantageously used for the negative electrode collector 22. The negative electrode active material layer 24 includes the negative electrode active material particles 60.

Negative Electrode Active Material Particles

As mentioned hereinabove, carbon-black-adhered carbon-based negative electrode active material particles, that is, carbon-black-adhered carbon-based negative electrode active material particles 60 in which the carbon black (CB) particles 64 have adhered to at least part of the surface portion and which are carbon-based negative electrode active material particles constituted by a carbon material having a graphite structure in at least part thereof, are used as the negative electrode active material particles. Various graphite materials, such as natural graphite and artificial graphite, which have been molded into spheres or flakes can be used as the graphite-based carbon material advantageous for manufacturing such a carbon-black-adhered carbon-based negative electrode active material.

Alternatively, a graphite-based carbon material in which the surface of graphite particles is coated with amorphous carbon can be advantageously used.

A CB which is caused to adhere to at least part of the surface portion (in the graphite-based carbon material with the amorphous carbon coating, the surface portion is inclusive of the coat layer of the amorphous carbon which is present on the surface of the graphite-based carbon material) of such graphite-based carbon material is not limited to any specific type, and a typical carbon black such as acetylene black (AB), Ketjen black, and furnace black can be used without any limitation.

A method for causing the CB to adhere to (to be carried on) the surface portion of the graphite-based carbon material is not particularly limited. For example, the preparation method can be used by which particles constituted by the graphite-based carbon material, a material (pitch, or the like) for forming the amorphous coat layer on the surface of the particles, and CB particles are kneaded and then calcined in a high-temperature range (for example, 500° C. (inclusive) to 1500° C. (inclusive)).

Particles of the carbon-black-adhered carbon-based negative electrode active material obtained by the calcination can be cooled and then ground by milling, etc., as necessary to adjust the particle size thereof as appropriate. Further, an appropriate binder may be introduced in the mixture of the carbon particles and CB particles in order to increase the adhesion between the CB particles and the graphite-based carbon material in the process of causing the CB particles to adhere to the surface portion of the particles constituted by the graphite-based carbon material.

The size of the carbon-black-adhered carbon-based negative electrode active material which has thus been obtained is not particularly limited, but it is preferred that a material be used which has an average particles size of, for example, 1 μm (inclusive) to 50 μm (inclusive) (typically, 5 μm (inclusive) to 20 μm (inclusive), preferably 8 μm (inclusive) to 12 μm (inclusive)) based on the laser diffraction and scattering method.

The average short diameter A of the CB particles 64 which have adhered to the carbon-black-adhered carbon-based negative electrode active material particles 60 is not particularly limited provided that the relationship of Formula (1) with the average inner diameter B of the hollow portions 34 of the positive electrode active material particles 30 is fulfilled, but from the standpoint of demonstrating a better effect (for example, low-temperature characteristic improvement effect) resulting from the adhesion of the CB particles to the surface portion of the carbon-black-adhered carbon-based negative electrode active material, it is preferred that the average short diameter be 20 nm or more, more preferably 40 nm or more, even more preferably 60 nm or more, and particularly preferably 100 nm or more. The upper limit of the average short diameter A is not particularly limited, but is preferably 4000 nm or less, more preferably 2000 nm or less, even more preferably 1000 nm or less.

From the standpoint of improving thermal stability or the like, it is preferred that the average short diameter A of the CB particles 64 be less than the average inner diameter B of the hollow portions 34 of the positive electrode active material particles 30 by 600 nm or more, more preferably 1000 nm or more, even more preferably 4000 nm or more. Further, a value obtained by subtracting the average short diameter A of the CB particles 64 from the average inner diameter B of the hollow portions 34 (that is, B−A) is preferably 12000 nm or less, more preferably 5600 nm or less, and even more preferably 5000 nm or less. For example, the B−A may be 4500 nm or less.

In the present specification, the "average short diameter A" of the CB particles is the average value of the short diameters of a plurality of CB particles contained in the negative electrode active material layer. Thus, the average short diameter A is determined, for example, in the following manner. A predetermined number (for example, 300 to 500) of negative electrode active material particles contained in the cross-sectional SEM image of the negative electrode active material layer are observed using a scanning electron microscope (SEM), and the smallest rectangles circumscribing each particle image are drawn. The length of the short side is then calculated as the short diameter of each particle for the rectangle drawn around the particle images. The average short diameter A can then be determined by arithmetic averaging of the short diameters of the predetermined number of the CB particles. The short diameter of the particles can be easily determined using image analysis software in a computer that performs predetermined processing according to a predetermined program.

The average long diameter of the CB particles 64 is not particularly limited. From the standpoint of demonstrating a better effect (for example, low-temperature characteristic improvement effect) resulting from the adhesion of the CB particles 64 to the surface portion of the carbon-black-adhered carbon-based negative electrode active material, the appropriate average long diameter is 20 nm or more, preferably 30 nm or more. The upper limit of the average long diameter is not particularly limited. The average long diameter of the CB particles 64 can be determined by calculating, as the long diameter of the particles, the lengths of the long sides of the smallest circumscribing rectangles drawn around the particle SEM images of the CB particles, and taking the arithmetic average of the long diameters of the predetermined number of the CB particles.

A carbon-black-adhered carbon-based negative electrode active material prepared such that the mass ratio α of the CB is $0.3 \leq \alpha \leq 5$, where the total mass of the graphite based carbon material and the CB in the carbon-black-adhered carbon-based negative electrode active material is taken as 100 (that is, the CB content ratio is 0.3% by mass (inclusive) to 5% by mass (inclusive) when the total of the graphite-based carbon material and the carbon black (CB) is taken as 100% by mass) can be advantageously used. The low-temperature characteristic of a lithium ion secondary cell can be further improved by using the carbon-black-adhered carbon-based negative electrode active material with such a CB content in combination with the above-described positive electrode active material in the form of hollow particles.

The mode of using the positive electrode and negative electrode disclosed herein is specifically explained by referring to a lithium ion secondary cell provided with a wound electrode body, but the present invention is not intended to be limited to such an embodiment.

Figure 2:
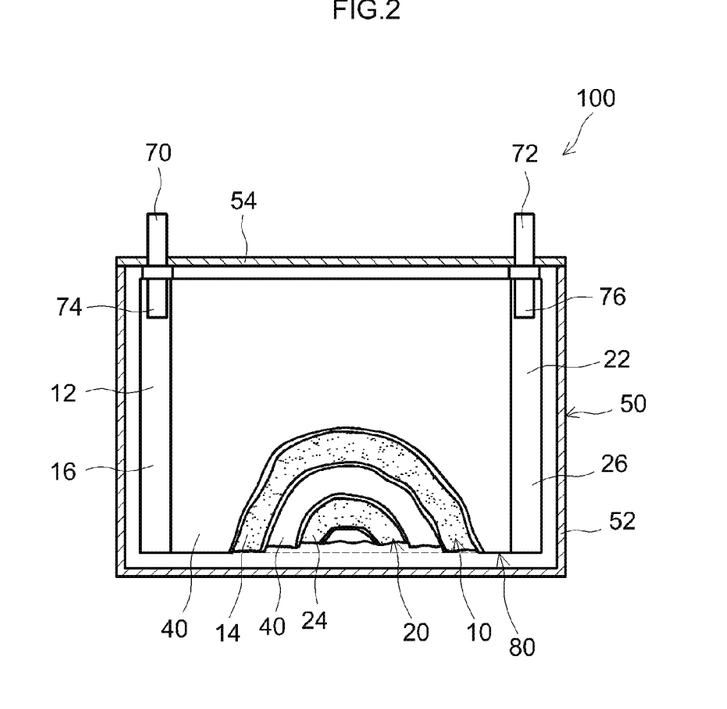
FIG. 2 illustrates schematically the lithium ion secondary cell according to the embodiment.

As depicted in FIG. 2, the lithium ion secondary cell 100 according to the present embodiment has a case 50 made of a metal (a resin or a laminated film can be also advantageously used). The case (outer case) 50 has a case main body 52 of a flat rectangular parallelepiped shape with an open upper end and a lid 54 that closes the opening. A positive electrode terminal 70 electrically connected to a positive electrode 10 of a wound electrode body 80, and a negative electrode terminal 72 electrically connected to a negative electrode 20 of the electrode body are provided at the upper surface (that is, the lid 54) of the case 50. The flat-shaped wound electrode body 80, for example, which is obtained by laminating the positive electrode (positive electrode sheet) 10 of an elongated sheet shape, the negative electrode (negative electrode sheet) 20 of an elongated sheet shape, and a total of two separators (separator sheets) 40 of an elongated sheet shape, winding the laminate, and then pressing and crushing the obtained wound body from the side surface sides, and the nonaqueous electrolytic solution are housed inside the case 50.

The positive electrode sheet 10 has the configuration in which, as described hereinabove, a positive electrode active material layer 14 including the positive electrode active material 30 of a hollow structure (see FIG. 1) as the main component is provided on both surfaces of the positive electrode collector 12 of an elongated sheet shape. However, the positive electrode active material layer 14 is not provided on one side edge in the width direction of the positive electrode sheet 10, and a positive electrode active material layer non-formation portion 16 is provided in which the positive electrode collector 12 is exposed over a predetermined width.

In addition to the positive electrode active material, the positive electrode active material layer 14 can include, as necessary, one or two or more materials that can be used as the constituent components of the positive electrode active material layer in a typical lithium ion secondary cell. An electrically conductive material is an example of the additive. A carbon material such as a carbon powder and carbon fibers is preferably used as the electrically conductive material. Or, a conductive metal powder such as a nickel powder may be used. Examples of other materials that can be used as components of the positive electrode active material layer include various polymer materials capable of functioning as binders for the constituent materials. For example, polymers such as polyvinylidene fluoride (PVDF) and polyvinylidene chloride (PVDC) can be advantageously used. Alternatively, a styrene-butadiene rubber (SBR), polytetrafluoroethylene (PTFE), polyethylene (PE), and polyacrylic acid (PAA) or the like may be used.

Similarly to the positive electrode sheet 10, the negative electrode sheet 20 also has the configuration in which the negative electrode active material layer 24 including the carbon-black-adhered carbon-based negative electrode active material 60 (see FIG. 1) as the main component is provided on both surfaces of the negative electrode collector in the form of an elongated sheet. However, the negative electrode active material layer 24 is not provided on one side edge in the width direction of the negative electrode sheet 20, and a negative electrode active material layer non-formation portion 26 is formed in which the negative electrode collector 22 is exposed over a predetermined width.

In addition to the negative electrode active material, the negative electrode active material layer 24 can include, as necessary, one or two or more materials that can be used as the constituent components of the negative electrode active material layer in a typical lithium ion secondary cell. A binder and various additives are examples of such a material. A binder of the same type as included in the above-described positive electrode can be used. Various other additives, such as a thickening agent and a dispersant can be also used, as appropriate. For example, carboxymethyl cellulose (CMC) or methyl cellulose (MC) can be advantageously used as the thickening agent.

The separator 40 is a member that separates, as depicted in FIG. 2, the positive electrode sheet 10 and the negative electrode sheet 20. In this example, the separator 40 is constituted by a strip-shaped sheet material of a predetermined width which has a plurality of fine holes. For example, a separator of a monolayer structure or a separator of a multilayer structure constituted by a porous polyolefin resin can be used as the separator 40. A layer of electrically insulating particles may be further formed on the surface of the sheet material constituted by such a resin. The electrically insulating particles may be in the form of an electrically insulating inorganic filler (for example, a filler constituted by a metal oxide or metal hydroxide), or electrically insulating resin particles (for example, particles of polyethylene or polypropylene).

During the lamination, the positive electrode sheet 10 and the negative electrode sheet 20 are placed on each other with a slight displacement in the width direction such that the positive electrode active material layer non-formation portion 16 of the positive electrode sheet 10 and the negative electrode active material layer non-formation portion 26 of the negative electrode 20 protrude from both sides, in the width direction, of the separator 40. As a result, the active material layer non-formation portions 16, 26 of the positive electrode sheet 10 and the negative electrode sheet 20 protrude outward from the respective winding core portions (that is, portions in which the positive electrode active material layer formation portion of the positive electrode sheet 10, the negative electrode active material layer formation portion of the negative electrode sheet 20, and the two separator sheets 40 are tightly wound) in the transverse direction with respect to the winding direction of the wound electrode body 80. A positive electrode lead terminal 74 and a negative electrode lead terminal 76 are provided at the protruding portion of the positive electrode side (that is, the positive electrode active material layer non-formation portion) 16 and the protruding portion of the negative electrode side (that is, the negative electrode active material layer non-formation portion) 26, respectively, and electrically connected to the positive electrode terminal 70 and the negative electrode terminal 72, respectively.

Solutions same as the nonaqueous electrolytic solutions which have been conventionally used in the lithium ion secondary cells can be used, without any particular limitation, as the electrolytic solution (nonaqueous electrolytic solution). Such a nonaqueous electrolytic solution typically has a composition including a support cell in an appropriate nonaqueous solvent. For example, one or two or more solvents selected from the group including ethylene carbonate, propylene carbonate, dimethyl carbonate, diethyl carbonate, ethylmethyl carbonate, 1,2-dimethoxyethane, 1,2-diethoxyethane, tetrahydrofuran, and 1,3-dioxolane can be used as the nonaqueous solvent. Examples of suitable support salts include lithium salts such as $LiPF_6$, $LiBF_4$, $LiAsF_6$, $LiCF_3SO_3$, $LiC_4F_9SO_3$, $LiN(CF_3S_2)_2$, and $LiC(CF_3SO_2)_3$. For example a nonaqueous electrolytic solution can be used in which $LiPF_6$ is contained at a concentration of about 1 mol/L in a mixed solvent of ethylene carbonate (EC), dimethyl carbonate (DMC), and ethylmethyl carbonate (EMC) (for example, at a volume ratio of 3:4:3).

When the lithium ion secondary cell is assembled, the wound electrode body 80 is housed inside the case main body 52 through the upper end opening of the main body 52 and the appropriate nonaqueous electrolytic solution is also disposed (poured) in the case main body 52. Then, the opening is sealed with the lid 54 by welding, etc., to complete the assembling of the lithium ion secondary cell 100 of the present embodiment. The process of sealing the case 50 and the process of disposing (pouring) the electrolytic solution may be performed according to the conventional method for manufacturing a lithium ion secondary cell and do not characterize the present invention. The construction of the lithium ion secondary cell 100 according to the present embodiment is thus completed.

Since the lithium ion secondary cell 100 constructed in the above-described manner has been assembled and constructed such that the average short diameter A of the CB particles in the CB particle negative electrode active material particles and the average inner diameter B of the hollow portions in the positive electrode active material particles have a specific ratio (B/A), the cell demonstrates excellent cell performance. For example, the cell excels in thermal stability.

Several test examples relating to the present invention will be explained hereinbelow, but the present invention is not intended to be limited to those test examples. In the explanation below, "%" stands for percent by mass, unless specifically stated otherwise.

In the present examples, the following tests were performed in order to investigate the effect produced by the ratio (B/A) of the average inner diameter B of the hollow portions in the positive electrode active material particles and the average short diameter A of the CB particles in the carbon-black-adhered carbon-based negative electrode active material. Thus, positive electrode active material particles with a hollow structure that had different inner diameters B of the hollow portions were prepared, and a positive electrode sheet provided with a positive electrode active material layer on both surfaces of a positive electrode collector was fabricated. Further, a carbon-black-adhered carbon-based negative electrode active material with different short diameters A of the CB particles was prepared, and a negative electrode sheet provided with a negative electrode active material layer on both surfaces of a negative electrode collector was fabricated. A lithium ion secondary cell for an evaluation test was constructed using the positive electrode sheet and negative electrode sheet, an overcharging withstand test was performed, and the effect produced by the aforementioned diameter ratio (B/A) on the cell performance was evaluated. The diameter ratios B/A of the average short diameter A of the CB particles in the carbon-blackadhered carbon-based negative electrode active material and the average inner diameter B of the hollow portions in the positive electrode active material particles which were used in the samples are shown in Table 1.

The positive electrode sheet was fabricated in the following manner. Hollow particles of a composition represented by $LiNi_{1/3}Co_{1/3}Mn_{1/3}O_2$ were used as the positive electrode active material. The positive electrode active material particles with a hollow structure that differed in the average inner diameter B of the hollow portions were prepared by changing the synthesis conditions (samples 2 to 12). For comparison, positive electrode active material particles with a solid structure which had no inner cavity were also prepared for comparison (sample 1).

The positive electrode active material particles, a carbon black as an electrically conductive material, and PVdF as a binder were mixed in NMP to obtain mass ratios of those materials of 90:8:2, thereby preparing a composition for forming a positive electrode active material layer. The positive electrode sheet with the positive electrode active material layer on both surfaces of the positive electrode collector was fabricated by coating the composition in a band-like form on both surfaces of an aluminum foil in the form of a long sheet and drying.

The negative electrode was fabricated in the following manner. A carbon-black-adhered carbon-based negative electrode active material prepared by causing acetylene black particles (referred to hereinbelow as CB particles) to adhere to the surface of particles constituted by a natural graphite material and then coating (covering) with amorphous carbon was used as the negative electrode active material. Carbon-black-adhered carbon-based negative electrode active materials that differed in the average short diameter A of the CB particles were prepared by changing the synthesis conditions (samples 1 to 12). In this case, carbon-black-adhered carbon-based negative electrode active materials with different CB content (CB amount) of 1% and 2%, where the total mass of the carbon-black-adhered carbon-based negative electrode active material was taken as 100% by mass, were prepared.

The negative electrode active material particles, a styrene-butadiene rubber (SBR) as a binder, and carboxymethyl cellulose (CMC) as a thickening agent were dispersed in water to obtain mass ratios of those materials of 98:1:1, thereby preparing a composition for forming a negative electrode active material layer. The negative electrode sheet with the negative electrode active material layer on both surfaces of the negative electrode collector was fabricated by coating the composition on both surfaces of a copper foil (negative electrode collector) in the form of a long sheet.

Lithium ion secondary cells for the evaluation test were then fabricated using the positive electrode sheets and negative electrode sheets of samples 1 to 12 fabricated in the above-described manner. The lithium ion secondary cells for the evaluation test were fabricated in the following manner. A flat wound electrode body was fabricated by laminating the positive electrode sheet and negative electrode sheet, with two separator sheets (a sheet of a three-layer structure including polypropylene (PP)/polyethylene (PE)/polypropylene (PP) and having a thickness of 20 μm and a pore size of 0.1 μm was used) being interposed therebetween, winding the laminate, and pressing and crushing the wound body from the side surface direction. The wound electrode body was housed together with a nonaqueous electrolytic solution in a box-shaped cell case, and the opening in the cell case was air-tightly closed. The nonaqueous electrolytic solution was prepared by including $LiPF_6$ as a support salt to a concentration of about 1 mol/L in a mixed solvent including EC, DMC, and EMC at a volume ratio of 3:4:3. Lithium ion secondary cells were thus assembled. Lithium ion secondary cells for the test were then obtained by performing, by the usual method, the initial charge-discharge treatment (conditioning). The rated capacity of such lithium ion secondary cells was about 4 Ah.

Overcharging Withstand Test

Figure 3:
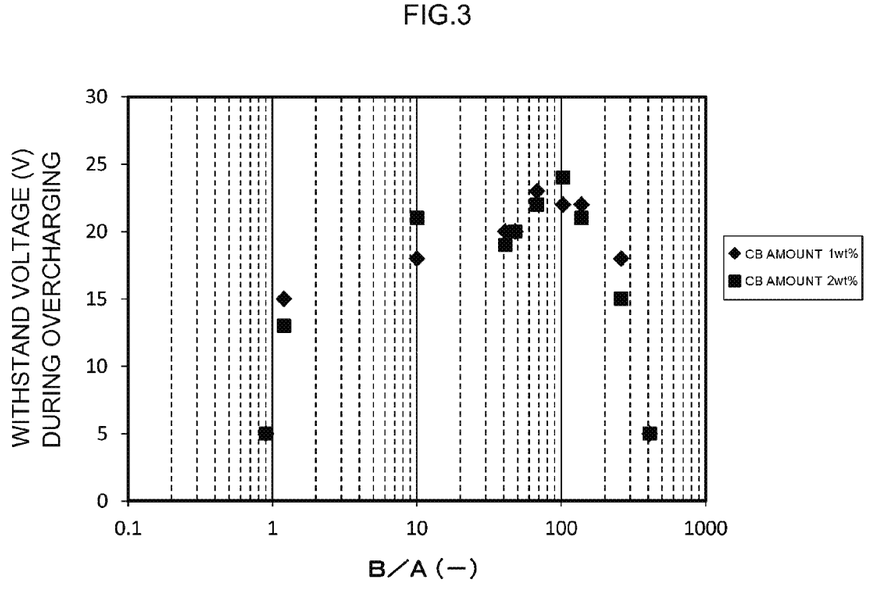
FIG. 3 is a graph illustrating the relationship between the diameter ratio (B/A) and the withstand voltage.

An overcharging withstand test was performed with respect to each of the lithium ion secondary cells for the test. More specifically, each cell was charged at a constant current of 20 A at a temperature of 25° C. and the terminal voltage of the cell was gradually raised. The temperature of the outer surface of the cell case during the test was measured. A voltage (withstand voltage) at a point of time at which the temperature of the outer surface of case exceeded 150° C. was measured. The results are shown in Table 1 and FIG. 3. FIG. 3 is a graph representing the relationship between the diameter ratio (B/A) and the withstand voltage. The abscissa in FIG. 3 is represented by a logarithmic plot. A higher value of the withstand voltage indicates that the increase in cell temperature during the overcharging was suppressed.

TABLE 1

| Sample | Negative electrode, CB particle Average short diameter A (nm) | Positive electrode, hollow portion Average inner diameter B (μm) | B/A | Withstand voltage during overcharging (V) CB amount 1 (%) | Withstand voltage during overcharging (V) CB amount 2 (%) |
|---|---|---|---|---|---|
| 1 | 10 | 0 (solid) | — | 5 | 5 |
| 2 | 10 | 4.1 | 410 | 5 | 5 |
| 3 | 40 | 4.1 | 103 | 22 | 24 |
| 4 | 60 | 4.1 | 68 | 23 | 22 |
| 5 | 100 | 4.1 | 41 | 20 | 19 |
| 6 | 400 | 4.1 | 10 | 18 | 21 |
| 7 | 3500 | 4.1 | 1.2 | 15 | 13 |
| 8 | 4600 | 4.1 | 0.9 | 5 | 5 |
| 9 | 40 | 1.9 | 48 | 20 | 20 |
| 10 | 40 | 2.7 | 68 | 23 | 22 |
| 11 | 40 | 5.5 | 138 | 22 | 21 |
| 12 | 40 | 10.4 | 260 | 18 | 15 |

As clearly follows from Table 1 and FIG. 3, in the cells relating to samples 3 to 7 and 9 to 12, in which the diameter ratio (B/A) of the average inner diameter B of the hollow portions of the positive electrode active material particles and the average short diameter A of the CB particles of the carbon-black-adhered carbon-based negative electrode active material was 1.2≤B/A≤260, the withstand voltage was 10 V or higher and the increase in the cell temperature during overcharging was suppressed as compared with the cells of samples 1, 2, and 7. In particular, a very high withstand voltage of 21 V or higher was reached in samples 3, 4, 10, and 11 in which the diameter ratio (B/A) was 68≤B/A≤138. Those results, have confirmed that a cell with excellent thermal stability can be realized by setting the diameter ratio (B/A) to 1.2≤B/A≤260 (preferably 68≤B/A≤138).

The present invention is explained hereinabove in detail, but the above-described embodiments are merely exemplary, and the invention disclosed herein is inclusive of many variations and modifications of the aforementioned specific examples.

As mentioned hereinabove, the nonaqueous electrolyte secondary cell provided by the technique disclosed herein demonstrates excellent performance and, therefore, can be used for a variety of applications. For example, such cells can be advantageously used as a power source for motors (electric motors) installed on vehicles such as automobiles. Such nonaqueous electrolyte secondary cells may be used as cell packs in which a plurality of the cells is connected in series and/or parallel. Therefore, with the technique disclosed herein, it is possible to provide a vehicle (typically, an automobile, in particular, an automobile equipped with an electric motor, such as a hybrid automobile, electric automobile, and fuel cell automobile) equipped with such a nonaqueous electrolyte secondary cells (can be in the form of a cell pack) as a power source.

What is claimed is:

1. A nonaqueous electrolyte secondary cell comprising: a positive electrode in which a positive electrode active material layer including positive electrode active material particles is formed on a positive electrode collector; a negative electrode in which a negative electrode active material layer including negative electrode active material particles is formed on a negative electrode collector; and a nonaqueous electrolytic solution, wherein the negative electrode active material particles are carbon-black-adhered carbon-based negative electrode active material particles which are constituted by a carbon material having a graphite structure in at least part thereof and which have carbon black (CB) particles that have adhered to at least part of a surface portion;

the positive electrode active material particles are of a hollow structure having a shell and a hollow portion formed inside the shell; and an average short diameter A of the CB particles in the carbon-black-adhered carbon-based negative electrode active material particles and an average inner diameter B of the hollow portions in the positive electrode active material particles fulfill the following relationship:

$1.2 \leq B/A \leq 260$.

2. The nonaqueous electrolyte secondary cell according to claim 1, wherein the average short diameter A of the CB particles in the carbon-black-adhered carbon-based negative electrode active material particles and the average inner diameter B of the hollow portions in the positive electrode active material particles fulfill the following relationship:

$68 \leq B/A \leq 138$.

* * * * *